United States Patent [19]

Ulrich

[11] 4,371,758
[45] Feb. 1, 1983

[54] DEFECTIVE SHORT HOLDING-TIME TRUNK IDENTIFYING METHOD

[75] Inventor: Werner Ulrich, Glen Ellyn, Ill.

[73] Assignee: Bell Telephone Laboratories, Incorporated, Murray Hill, N.J.

[21] Appl. No.: 271,366

[22] Filed: Jun. 8, 1981

[51] Int. Cl.³ .................. H04M 3/22; H04M 3/36; H04M 15/00; H04M 15/38
[52] U.S. Cl. .................. 179/175.2 C; 179/7.1 R; 179/8 A; 179/27 G
[58] Field of Search ........ 179/175.2 C, 27 G, 18 AG, 179/8 A, 7.1 R, 175.2 R, 175.2 D

[56] References Cited

U.S. PATENT DOCUMENTS

| | | | |
|---|---|---|---|
| 3,492,445 | 1/1970 | Lecoanet | 179/27 G |
| 3,760,114 | 9/1973 | Morton et al. | 179/27 G |
| 4,165,447 | 8/1979 | Bertoglio et al. | 179/7.1 R |
| 4,319,090 | 3/1982 | Gatewood et al. | 179/8 A |

Primary Examiner—Thomas A. Robinson
Attorney, Agent, or Firm—F. W. Padden

[57] ABSTRACT

A method is disclosed for automatically detecting a trunk that is likely to be defective even though it passes operational tests incident to switching it into service. In a telephone system, such a trunk might, for example, be so noisy or ineffective for transmission that customers cannot communicate over that trunk. Resultingly, the trunk is likely to handle a much higher than normal number of calls with short holding times since the customers quickly discover that they cannot communicate and terminate the calls. The method is implemented via telephone call processing, memory lists, and a program routine integrated into the call disconnect sequences. It allows such defective trunks to be identified by the steps of: detecting all calls with short holding times, successively processing trunk identities which have a repetition of such short holding-time calls, and alerting the maintenance force when such trunks have been processed through several memory lists.

30 Claims, 3 Drawing Figures

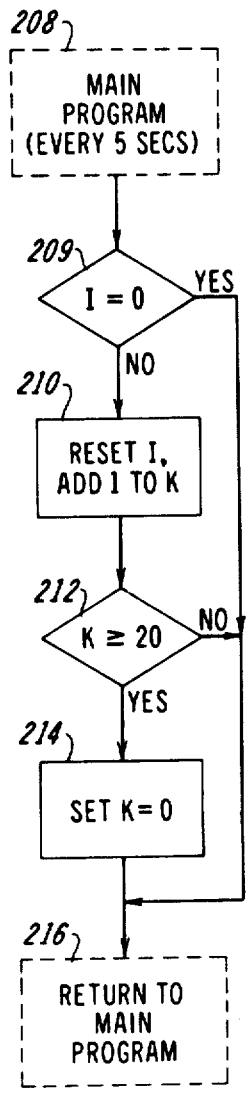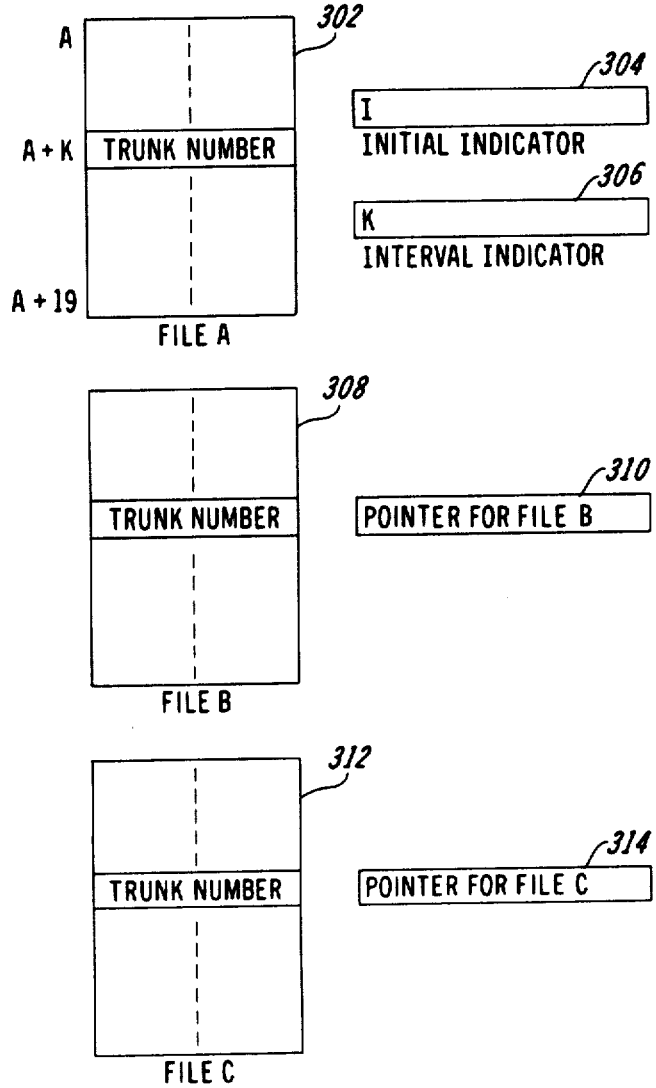

DEFECTIVE SHORT HOLDING-TIME TRUNK IDENTIFYING METHOD

TECHNICAL FIELD

This invention relates to a method of identifying defective functional circuits in a communication system. The invention particularly pertains to a discovery for identifying a trunk involved in short holding-time calls and for processing that identity successively through a plurality of short holding-time offender memory lists so that a maintenance record is automatically made of the potentially defective trunk.

BACKGROUND OF THE INVENTION

In a communications network, trunks are used as facilities to interconnect different nodes of the network. Occasionally, such a trunk becomes defective but does so in such a way that the defect is not detected by the traditional, operational tests integrated into conventional call processing procedures. For example, in a telephone network, a trunk may appear to be operationally satisfactory to central office equipment but is actually nonusable for communication because it is excessively noisy or speech communication may be impossible over the trunk. When such a trunk is engaged on a call, a customer usually detects the inoperative condition and terminates the call after a very short holding time. Customarily, no trouble or maintenance record is made of such calls and occasionally the telephone company is made aware of the poor service condition only by a customer complaint.

These defective trunks create an especially serious situation during the busy hour. Since such trunks have naturally short holding times, they become repeatedly available for customer use and are responsible for a substantial number of unsuccessful call attempts.

In a toll telephone network, many such trunks are detectable because they are used on operator calls. According to established practices, operators are instructed to key information into the system which provides for a maintenance record of call details including the indentity of the trunk used on the call. That record is subsequently analyzed to identify the trunk. However, for trunks which are not used by operators, automatic detection and identification becomes much more difficult. The problem is particularly acute in private networks, such as Enhanced Private Switched Communications Services which use a relatively small number of trunks. Because of such a deficiency, the customer is often subjected to the seizure and use of the same defective trunk several times before a successful call can be completed.

In view of the foregoing, it is apparent that a need exists for a method of identifying defective trunks having the foregoing problems and for doing so with a minimum of additional overhead call processing.

SUMMARY OF THE INVENTION

The foregoing need is fulfilled in accordance with a specific exemplary method of identifying such defective trunks, or functional circuits, through an analysis of the identity of trunks involved in short holding-time connections. The discovery is illustratively applicable in electronic program controlled telephone switching systems, for calculating call duration and entering the identities of trunks involved in short holding-time calls, illustratively on first, second and third call-offender memory lists. Trunk identities are automatically removed from the lists as they become the oldest defective trunk candidate and as a new trunk identity is to be entered. When a short-duration call occurs on a trunk whose identity is stored on the third offender memory list, a trouble message printout is made for maintenance personnel.

It is customary in most present-day switching systems to record the time that each call is answered. The answer time is advantageously used in the illustrative embodiment is determining the duration of each call.

A departure in the art achieved with this invention is that at the time that a call disconnect is discovered, a check is made to determine if the call lasted less than a prescribed duration, such as 8 seconds. The check is made, by way of example, by calculating the call answer and disconnect times. If the call duration was longer than prescribed, the call is ignored from the viewpoint of this invention since it is not considered a short holding-time call. When the duration is less than that prescribed, the trunk is identified and, further, that identity is successively processed through offender memory lists. The minimum duration may be other than 8 seconds to accommodate different classes of trunks and customer calling habits, such as those involved in very short holding-time data transaction calls, suburban residential customers, and large city environments involved, for example, in brokerage and other short holding-time business calls.

Each time a short holding-time call is discovered, the number identity of the trunk serving the call is compared with a first list of trunk numbers previously involved with short holding times. If no match is found, a decision is made as to whether this particular trunk should be entered on the first list. If a match is found, such a trunk is then identified as a candidate for a second list. Candidates for the second list are then compared with other candidates on a second list. If a match is found, the trunk is then considered a candidate for a third list. If a candidate for the third list also finds a match with an entry in the third list, a maintenance output message is sent to a maintenance center. Whether or not matches are found in the second and third lists, a new candidate is always added to the list, and the oldest entry is deleted in order to make room for the new candidate.

It is a feature of this invention that the processing steps advantageously include a selection of a random trunk among many trunks involved in short holding-time calls for entry into a first memory list and the retention of the random trunk number identity in that first list for a minimum period. The processing steps further include the retention for an additional time period in the first list of any trunk number which is already in the first list and which is used for another short holding-time call. The steps also provide for the removal from all lists of the oldest trunk number as new trunk numbers are discovered. These aspects of the processing steps militate toward the minimizing of the probability of falsely identifying a trouble-free trunk, while helping to maximize the probability of detecting a trunk that is in trouble.

DRAWING DESCRIPTION

FIG. 2 depicts method steps in a timing program for a periodic entry into a memory list of a trunk number involved in a newly discovered short holding-time call; and FIG. 3 illustrates memory allocated to the three offender lists, an initial indicator, an interval counter and pointers for the offender memory lists.

Figure 1:
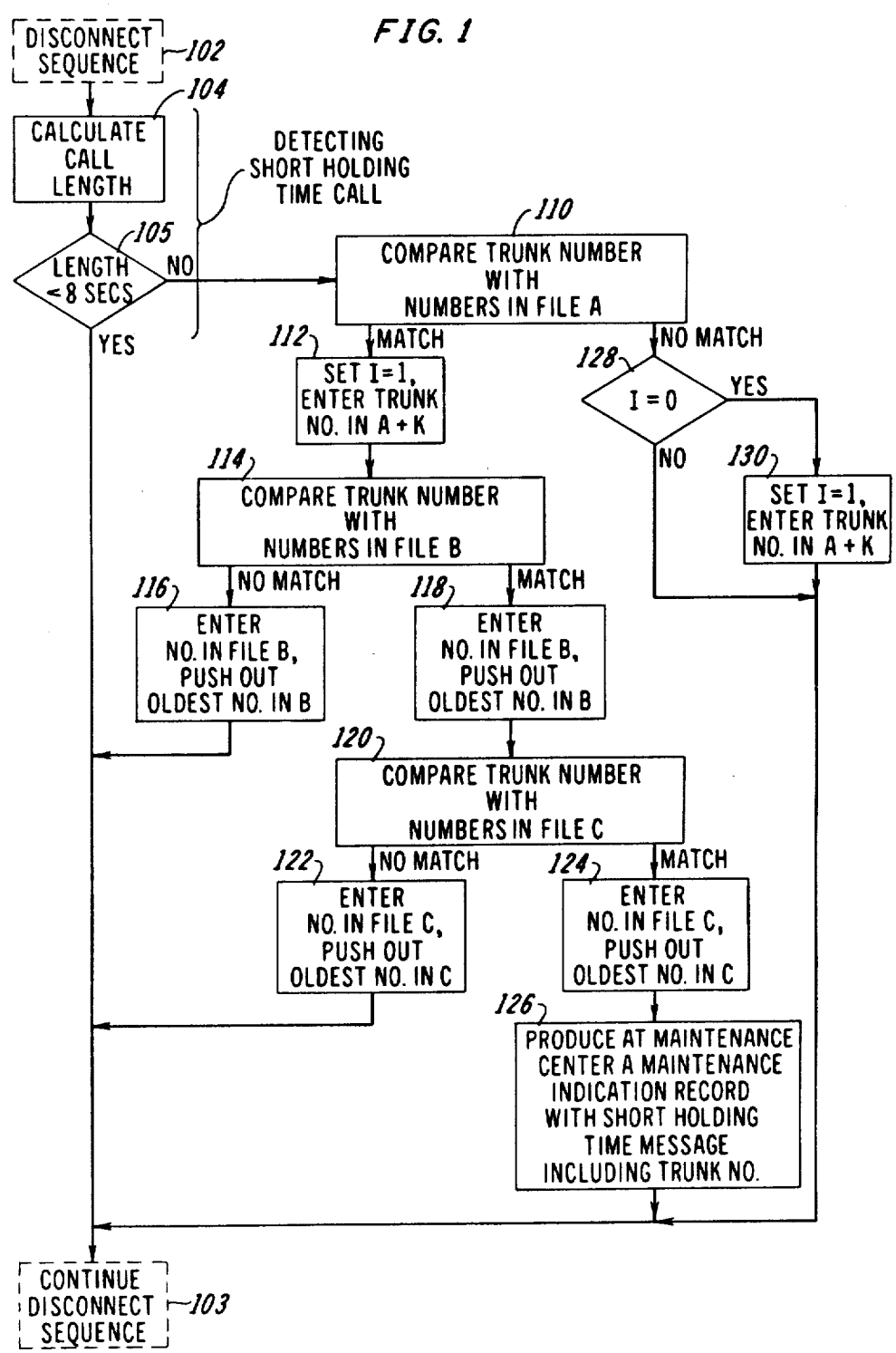
FIG. 1 shows the method steps for detecting short holding-time calls as integrated into a program for processing telephone traffic and for processing trunk numbers successively through three memory lists.

The method steps are illustratively integrated into the call processing of a program-controlled telephone system known as the No. 1 ESS (Electronic Switching System) which is in commercial use and is disclosed in the *Bell System Technical Journal* (BSTJ), September 1964, Volume XLIII, Number 5, Parts 1 and 2; and in the R. W. Downing et al., U.S. Pat. No. 3,570,008 of Mar. 9, 1971. These disclosures and the citations referred to therein may be consulted for a complete understanding of the construction and operations of a typical telephone system suitable for use with this invention.

DETAILED DESCRIPTION

The present invention utilizes call-processing tehniques, as described and flowcharted, beginning on page 2483 of the aforementioned BSTJ. During the processing of a billable all according to the BSTJ disclosed techniques (BSTJ, FIG. 11, page 2499), a record is made of strategic call parameters including the number of the trunk utilized for serving the call and the time at which that call was answered at the called station (BSTJ), FIG. 31, page 2526). Such a record is retained in call store memory as long as the call is being served.

Use of the present method of detecting trunks associated with short holding-time calls requires that calls be timed as is accomplished to the No. 1 ESS. Such timing is normally done for all traffic which is billed to customers.

A departure from the prior art as provided by this invention is the modification of the disconnect sequence of operations which arise when the call is terminated. The modification suitably involves the No. 1 ESS program instructions in its program store. The modified sequence of steps is illustrated in FIG. 1. Boxes 102 and 103 represent the current implementation of disconnect as described in the aforementioned BSTJ article beginning on page 2483 and the balance of FIG. 1 represents additions required illustratively to implement this invention.

First, the length of the call is calculated (Box 104) upon detection of a disconnect (see aforementioned BSTJ, FIG. 34, page 2528). This is done by comparing the actual time of disconnect with the answer time heretofore conventionally recorded as described in the aforementioned BSTJ article. If this length is less than some number of seconds, for example, 8 seconds (Box 105), then a short holding-time trunk detection routine is entered. Otherwise, the normal disconnect sequence is continued. The calculation of call duration is very short; thus, the resultant increase in real-time call processing for all calls in order to detect a potentially defective trunk involved in a short holding-time call is very small.

The interval used to distinguish a short holding-time call from a regular call, in the illustrative example, 8 seconds, could also be allocated by the No. 1 ESS central processor to be a quantity that is associated with the particular trunk involved in the call disconnect, and could vary from trunk to trunk, from trunk group to trunk group, and from trunk type to trunk type. The derivation of the appropriate interval, greater or less than, for example, the 8 seconds, is controllable by translations of the No. 1 ESS central processor incident to the call disconnect sequence as described in the aforementioned BSTJ in the article starting on page 2533.

The short holding-time trunk detection routine is a sequence of steps illustratively executed under control of instructions in the No. 1 ESS program store. The routine provides for the processing, or sequencing, of a potentially defective trunk number identity illustratively through three memory files designated A, B, and C in FIG. 3. These files, by way of example, are suitably available in the call store of the No. 1 ESS.

Before describing the detailed steps in the detection routine, it is advantageous at this point to explain modifications to the main program, or executive control program, of the No. 1 ESS as illustrated in FIG. 2. The modifications involve steps for administering the entry of trunk number identities into File A, Box 302, of FIG. 3 so that such an identity is entered into File A only at prescribed intervals, for example, every 5 seconds. Such an arrangement prevents a flood of trunk identities from being entered into File A and a rapid displacement of earlier stored trunk identities in that file.

In a large, busy office, the number of substantially simultaneous short holding-time calls may be quite large. If every detected short holding-time trunk were entered into File A, and File A were kept small, a defective trunk might be deleted from File A before it served a second short holding-time call. The present method illustratively provides for a procedure for sequentially entering every 5 seconds into the File A the trunk identifying number used on only one detected short holding-time call. This is accomplished by essentially gating such a trunk number for writing it into File A under control of an Initial Indicator I (FIG. 3, Box 304). Indicator I, when set illustratively to 0, allows an entry of the trunk number into File A. Thereafter, under control of the process steps of FIG. 1, Steps 112 and 130, the indicator 304 is set to 1 to preclude further trunk number entry into File A until the current 5-second interval elapses. The Initial Indicator is reset every 5 seconds by the program whose flowchart is shown in FIG. 2 to permit a new trunk number to be written into File A and processed through the memory lists A, B, and C.

If a short holding-time call has been detected, as described above with respect to FIG. 1, a check is made (Step 110) to see whether the particular trunk has previously been associated with a short holding-time call. Trunks which have been detected are matched against a list in File A (FIG. 3, Box 302) of such previously detected trunks. As shown in FIG. 1, if no match is found with the trunks in File A, a check (Step 128) is made by an examination of the Initial Indicator, to see if this is the first trunk during the current 5-second interval to have been so detected; if not, the normal disconnect sequence is resumed. If it is the first trunk so detected during this 5-second interval, the Initial Indicator is set to 1 (Step 130) to block subsequent trunks from being entered in the file for the remainder of the current 5-second interval. This trunk is now entered in File A at the slot indicated by the Interval Counter (FIG. 3, Box 306) of 5-second intervals. The count is a rotating count which goes from 0 to 19. This permits up to 20 trunks to be stored in File A and permits a trunk to be cleared from File A after it has remained there, unmatched, from at least 100 seconds. After these actions have been performed, in the case of an unmatched trunk, the normal disconnect sequence is resumed.

If the trunk identified in Step 105 matches one of the entries in File A, the trunk is automatically recorded (Step 112) in the present time slot of File A. This is to give the maximum opportunity for detecting repeated short holding-time attempts on this trunk by insuring that it will remain in File A for at least another 100 seconds. The Initial Indicator 304 of FIG. 3 is also set to indicate that a trunk has been entered into File A during this 5-second interval. The trunk number is next compared (Step 114) with that of trunks in File B (FIG. 3, Box 308). If the trunk identified in Box 105, which has already matched a trunk in File A, does not match (Step 116) any of the trunks in File B, this trunk is entered in File B; the oldest entry in File B is deleted, and the disconnect program is resumed. If, however, the trunk matches (Step 118) one of the entries in File B, a further comparison is made with trunks in File C, (FIG. 3, Box 312). If a match is found (Step 124) with an entry in File C, an output short holding-time message is sent (Step 126) to the maintenance center or console, indicating that this trunk has had an unusually high incidence of short holding-time calls; the disconnect program is then resumed. A trunk detected and processed through this memory list is statistically likely to be defective. This invention provides for the automatic removal of the trunk from service as part of a final operation the the trunk identification and detection sequence. If no match (Step 122) is found, the trunk is entered in File C; the oldest entry in File C is deleted, and the disconnect program is resumed.

Illustratively, the short holding-time message comprises the trunk number identity together with other pertinent call details, such as the calling number. The latter item enables maintenance personnel to identify stations which customarily conduct a substantially high percentage of short duration calls incident to their normal business, for example, stations involved in data and stock brokerage transactions.

The method of controlling the sequencing of new entries into File A is shown in FIG. 2. It provides that a new timing routine is initiated by a Main Program (208 of FIG. 2) entry every 5 seconds. The operation of the Main Program is described in detail in an article in the aforementioned issue of the BSTJ beginning on page 1923. This timing routine resets in Step 210 an Initial Indicator (FIG. 3, box 304) which will allow the next occurring short holding-time call to be entered in File A. The timing routine keeps a rotating count K in an interval indicator counter 306 of FIG. 3 so that the trunk which is discovered during any 5-second interval is added in proper sequence in File A. A check is made (Step 209) to see if any trunks have been entered during the last 5 seconds; if not, no further action is necessary. Otherwise, the count is incremented (Step 210) to define a next location in memory File A. A check is made (Step 212) to see if the count has reached 20; if so, it is reset to 0 (Step 214), thus, keeping the count within the limits of 0 and 19. Step 216 involves a return to the main program following the counter operation Steps 212 and 214.

FIG. 3 shows the layouts of the blocks of memory involved in this invention. File A has storage for 20 trunk numbers. The associated interval counter 306 is used to keep track of 5-second intervals in order to allow trunks discovered in different intervals to be entered in different locations within File A.

Initial Indicator I is used to keep track of whether an entry has been made in File A during the current 5-second interval.

Files B and C are similar to File A except that their sizes may be different from that of File A and from each other. In this illustrative embodiment, Files B and C have room for 10 entries. Pointers are associated with Files B and C, pointing to the oldest entry. This oldest entry will be overwritten by a new entry, as described above; the pointer is then advanced to the next position, in preparation for a new entry. Whenever the pointer is advanced beyond the end of a file, it must be reset to the position of the beginning of the file.

The particular method described here accomplishes a number of objectives. Using a method that is relatively independent of the amount of traffic in the office, it allows trunks which have an unusually high incidence of short holding time to be detected. Trunks which have only occasional short holding-time traffic are generally removed from Files A, B and C before an alarm is sent. File A is not made a simple delete-oldest-entry file because, in a busy telephone system, the interval between successive occurrences of short holding-time calls for a given trunk may be too long to allow the trunk to be retained in File A for this interval.

It is to be understood that the hereinbefore described arrangements are illustrative of a specific application of the principles of this invention. In light of this teaching, it is apparent that numerous other arrangements may be devised by those skilled in the art without departing from the spirit and scope of the invention. The choice of thresold for the detection of short holding-time calls, the method of making a decision of when to enter a potential trunk in File A, the lengths of Files A, B, and C, the choice of a time interval for successive entries in File A, the particular method of making a choice of whether or not to enter a candidate into File A, the number of files, the particular method of alarming, are all subject to adaptation to the needs of a particular system. It is also within the purview of this invention to utilize the discovery in data communication systems for identifying potentially defective functional circuits and channels involved in short holding-time communications.

What is claimed is:

1. A method of automatically identifying a functional circuit recurrently engaged on short-duration communications comprising:
   detecting communications of less than a prescribed duration served by said circuit,
   processing the identity of said circuit through memory in response to the detected communications, and
   producing a maintenance indication signifying the processed circuit identity involved in a predetermined plurality of said detected communications less than said prescribed duration.

2. A method of automatically identifying a functional circuit recurrently engaged on short-duration communication calls comprising:
   detecting communications of less than a prescribed duration served by said circuit, said detecting step comprising the steps of
   calculating in response to a receipt of a call disconnect signal the elapsed time between the occurrence of a call answer signal and said disconnect signal, and signifying when the calculated elapsed time is less than said prescribed duration;

processing the identity of said circuit through memory in response to the detected communications; and producing a maintenance indication signifying the processed circuit identity involved in a predetermined plurality of said detected communications less than said prescribed duration.

3. The invention of claim 2 wherein said processing step comprises the step of successively entering said circuit identity into a plurality of memory lists in response to a plurality of said calls detected to be less than said prescribed duration and served by said circuit.

4. The invention of claim 3 wherein said entering step comprises writing said circuit identity into three said memory lists in response to at least three said detected calls.

5. The invention of claim 3 wherein said plurality of memory lists comprises three memory lists.

6. The invention of claim 3, 4, or 5 wherein said producing step comprises the step of furnishing said maintenance indication following said entering of said circuit identity into said plurality of memory lists and in response to a subsequent call of less than said prescribed duration served by said circuit.

7. The invention of claim 2 wherein said processing step comprises the steps of comparing said circuit identity with circuit identities stored in said memory and in response to said signifying that the calculated elapsed time is less than said prescribed duration and entering for storage in said memory said circuit identity in response to said comparing indicating that said circuit identity fails to match one of said circuit identities stored in said memory.

8. The invention of claim 7 wherein said entering step comprises the steps of resetting an initial indicator in said memory to enable the writing of said circuit identity into said memory for storage and writing said circuit identity into said memory for storage in response to said initial indicator resetting.

9. The invention of claim 8 wherein said entering step further comprises the steps of resetting said initial indicator at periodically recurring timed intervals during which said entering step is carried out to enable said writing of said circuit identity into said memory for storage and setting said initial indicator to preclude the writing of any circuit identities for a current one of said timed intervals.

10. The invention of claim 9 wherein said entering step further comprises the step of counting the number of the periodically recurring timed intervals during which said entering step is carried out to define a present address location in said memory for writing thereinto said circuit identity.

11. The invention of claim 10 wherein said counting step comprises the step of counting on a resettable interval indicator said periodically recurring timed intervals and resetting the interval indicator count in response to an attainment therein of a predetermined count.

12. The invention of claim 7 wherein said memory comprises a first memory file having storage locations for functional circuit identities and wherein said comparing step comprises the step of comparing said circuit identity with circuit identities stored in said first memory file in response to said signifying that the calculated elapsed time is less than said prescribed duration and inserting for storage in a defined one of said storage locations in said first memory file said circuit identity and in response to said last-mentioned comparing indicating that said circuit identity matches one of said circuit identities stored in said first memory file.

13. The invention of claim 12 wherein said inserting step comprises the steps of setting an initial indicator in said memory to preclude the writing of other circuit identities into said storage locations of said first memory file and writing said circuit identity into said defined one of said storage locations.

14. The invention of claim 13 wherein said inserting step comprises the step of resetting said initial indicator at periodically recurring timed intervals, and counting the number of said periodically recurring timed intervals during which said entering step is carried out to specify said defined one of said storage locations for said writing of said circuit identity therein.

15. The invention of claim 12 wherein said memory further comprises a second memory file having storage locations for functional circuit identities and further comprising the step of placing said circuit identity into a storage location in said second memory file for storage.

16. The invention of claim 15 wherein said placing step comprises removing an oldest stored identity in said second memory file incident to the placing of said circuit identity into said storage location in said second memory file.

17. The invention of claim 12 wherein said memory further comprises a second memory file having storage locations for functional circuit identities and further comprising the steps of comparing said circuit identity with circuit identities in said second memory file and entering said circuit identity for storage in one of said storage locations of said second memory file and in response to said last-mentioned comparing.

18. The invention of claim 17 wherein said last-mentioned entering step comprises the step of removing an oldest stored identity in said second memory file incident to the entry of said circuit identity into said storage location in said second memory file.

19. The invention of claim 17 wherein said last-mentioned comparing and entering steps occur in response to a second call served by said functional circuit and being of less than said prescribed duration.

20. The invention of claim 17 wherein said memory further comprises a third memory file having storage locations for functional circuit identities and further comprising the steps of comparing said circuit identity with circuit identities in said third memory file and entering said circuit identity for storage in one of said storage locations of said third memory file and in response to said last-mentioned comparing.

21. The invention of claim 20 wherein said last-mentioned entering step comprises the step of removing an oldest stored identity in said third memory file incident to the entry of said circuit identity into said storage location in said third memory file.

22. The invention of claim 20 wherein said last-mentioned comparing and entering steps occur in response to a third call served by said functional circuit and being of less than said prescribed duration.

23. The invention of claim 22 wherein said producing of a maintenance indication occurs in response to a subsequent call served by said functional circuit and being of less than said prescribed duration.

24. The invention of claim 23 further comprising the step of removing said functional circuit from service following a generation of said maintenance indication.

25. The invention of claim 23 further comprising the step of producing a maintenance record with a short holding-time message including the identity of said functional circuit.

26. The invention of claim 20 wherein said circuit identity is entered in said second and third memory files at respective storage locations thereof identified by respective pointers for said last-mentioned files.

27. A method of automatically identifying trunks recurrently engaged on short holding-time calls comprising allocating for each of said trunks an individual prescribed time duration identifying a short holding time for a call served by said each of said trunks, detecting calls of less than said allocated prescribed time durations served by trunks, processing the identities of said last-mentioned trunks through memory in response to the detected calls, and producing a maintenance indication signifying each processed circuit identity involved in a predetermined number of calls less than said allocated time duration.

28. A method of automatically identifying a trunk recurrently engaged on short-duration calls comprising detecting a call of less than a prescribed duration on said trunk, identifying said trunk, comparing the identity of said trunk with trunk identity data storable in a first memory, storing said trunk identity in said first memory when said comparing results in an absence of an identity match, sensing a subsequent call of less than said prescribed duration and served by said trunk, matching for said subsequent call the identity of said trunk with the stored trunk identity in said first memory, storing said matched trunk identity in a second memory, detecting a succeeding call of less than said prescribed duration and served by said trunk, and comparing for said succeeding said trunk identity with the stored trunk identity in said second memory to effect a production of a trunk short duration call record.

29. The invention of claim 28 further comprising storing the compared trunk identity in a third memory in response to said comparing indicating a match of said trunk identity with a stored trunk identity in said second memory producing a maintenance indication in response to a further call served by said trunk and having a duration less than said prescribed duration, and removing said trunk from service in response to the produced maintenance indication.

30. A method for automatically identifying a trunk recurrently engaged on short holding-time calls in a program-controlled telephone switching system having a program store, a call store having first, second and third memories, and a central control, said central control being responsive to program instructions from said program store for controlling the processing of call communication over said trunk and being responsive at the time of processing of a disconnection sequence on each call served by said trunk for implementing the steps of calculating the duration of said call, determining whether the duration is less than a prescribed duration, continuing a call disconnect sequence in response to determining that the call duration exceeds said prescribed duration, comparing the number identity of said trunk with numbers stored in said first memory of said call store, periodically gating the entry of the compared trunk number identity into said first memory under control of an initial indicator, writing the gated trunk number identity into said first memory at a location identified by an address count of an interval indicator, resuming said call disconnect sequence in response to a failure of said comparing to indicate a match of said trunk number identity with numbers stored in said first memory and following said writing, comparing said trunk number identity with numbers stored in said second memory following a match of the compared numbers in said first memory, writing said trunk number identity into said second memory and resuming said disconnect sequence in response to a failure of said last-mentioned comparing to match the compared numbers, writing said trunk number identity into said second memory in response to said last-mentioned comparing finding a match of the compared numbers, comparing said trunk number identity with numbers stored in said third memory following a match of the compared trunk identity with a number stored in said second memory, writing said trunk number identity into said third memory and resuming said disconnect sequence in response to a failure of said last-mentioned comparing to match the compared numbers, writing said trunk number identity into said third memory in response to said last-mentioned comparing finding a match of the compared numbers, subsequently producing at a maintenance center a maintenance indication record with a short holding-time message including said trunk number identity, and removing said trunk from service.

* * * * *